(12) United States Patent
Kindo et al.

(10) Patent No.: US 7,024,380 B2
(45) Date of Patent: Apr. 4, 2006

(54) E-COMMERCE SYSTEM AND METHOD

(75) Inventors: Toshiki Kindo, Yokohama (JP);
Hideyuki Yoshida, Sagamihara (JP);
Takehiko Shida, Yokohama (JP);
Hiroshi Takase, Matsudo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 802 days.

(21) Appl. No.: 09/985,736

(22) Filed: Nov. 6, 2001

(65) Prior Publication Data
US 2002/0055885 A1 May 9, 2002

(30) Foreign Application Priority Data
Nov. 8, 2000 (JP) .............................. 2000-340741

(51) Int. Cl.
*G06F 17/60* (2006.01)

(52) U.S. Cl. .............................. 705/26; 705/27; 705/51; 705/14; 707/9; 707/10; 709/226; 709/229

(58) Field of Classification Search .................. 705/26, 705/27, 64, 10, 51, 14; 707/5, 9, 10; 709/226, 709/229; 713/201
See application file for complete search history.

(56) References Cited

U.S. PATENT DOCUMENTS

| | | | | |
|---|---|---|---|---|
| 5,872,850 A | * | 2/1999 | Klein et al. ..................... | 705/51 |
| 6,006,332 A | * | 12/1999 | Rabne et al. .................. | 713/201 |
| 6,014,638 A | * | 1/2000 | Burge et al. ................... | 705/27 |
| 6,236,990 B1 | * | 5/2001 | Geller et al. ..................... | 707/5 |
| 6,330,610 B1 | * | 12/2001 | Docter et al. ................. | 709/229 |
| 6,363,383 B1 | * | 3/2002 | Kindo et al. ..................... | 707/9 |
| 6,591,300 B1 | * | 7/2003 | Yurkovic ..................... | 709/226 |
| 6,687,703 B1 | * | 2/2004 | Kindo et al. ................... | 707/10 |
| 6,820,204 B1 | * | 11/2004 | Desai et al. ................. | 713/201 |
| 6,839,680 B1 | * | 1/2005 | Liu et al. ....................... | 705/10 |
| 2001/0056409 A1 | * | 12/2001 | Bellovin et al. .............. | 705/64 |

FOREIGN PATENT DOCUMENTS

| | | | |
|---|---|---|---|
| JP | 9171450 | | 6/1997 |
| JP | 9288683 | | 11/1997 |
| JP | 11 143900 | * | 5/1999 |
| JP | 11143900 | | 5/1999 |
| JP | 00132559 | | 5/2000 |
| JP | 00132618 | | 5/2000 |
| KR | 2000-17788 | | 4/2000 |

(Continued)

OTHER PUBLICATIONS

Press Release, "Allstarlineup.com capitalizes on Thriving Online Sports And Entertainment Memorabilia Market", PR Newswire; Aug. 10, 2000 extracted from Dialog database on Nov. 3, 2005.*

(Continued)

*Primary Examiner*—Yogesh C. Garg
(74) *Attorney, Agent, or Firm*—Greenblum & Bernstein, P.L.C.

(57) ABSTRACT

In an e-commerce system which rearranges merchandise information pieces distributed to a consumer to match preferences of the consumer based on a personal profile with which various keywords contained in the merchandise information pieces and evaluation values corresponding to the keywords are registered where the evaluation values are learned in advance based on preferences of the consumer, while withdrawing a charge of merchandise from an account designated by the consumer to pay to the seller when receiving an order from the rearranged merchandise information pieces, an order for merchandise from the merchandise information pieces distributed to one consumer is placed using the personal profile of another consumer.

6 Claims, 10 Drawing Sheets

FOREIGN PATENT DOCUMENTS

KR    2000-49934    8/2000

OTHER PUBLICATIONS

An English Language abstract of JP 9-171450.
An English Language abstract of JP 9-288683.
An English Language abstract of JP 11-143900.
An English Language abstract of JP 2000-132559.
An English Language abstract of JP 2000-132618.
An article entitled "Cosmetics, Beauty Site and Attempts to Capture Ladies' Attention", published in Korea Economic Daily, Jan. 11, 2000.
English language Abstract of Korean 2000-49934.
English language Abstract of Korean 2000-17788.

* cited by examiner

| NUMBER | KEYWORD | CODE DICTIONARY SIGN |
|---|---|---|
| 1 | AAA(SELLER ID) | 00000 |
| 2 | BBB(SELLER ID) | 00001 |
| 3 | A00(MERCHANDISE ID) | 00010 |
| 4 | B00(MERCHANDISE ID) | 00011 |
| 5 | SHIRT | 00100 |
| 6 | LONG SLEEVES | 00101 |
| 7 | SHORT SLEEVES | 00110 |
| 8 | PANTS | 00111 |
| 9 | JEANS | 01000 |
| 10 | CHINO PANTS | 01001 |
| 11 | SKIRT | 01010 |
| 12 | LONG | 01011 |
| 13 | SHORT | 01100 |
| 14 | ¥5,000〜¥10,000 | 01101 |
| 15 | ¥10,000〜¥15,000 | 01110 |

FIG.5

| NUMBER | KEYWORD | SCORE (POSITIVE) | SCORE (NEGATIVE) |
|---|---|---|---|
| 1 | AAA(SELLER ID) | 8 | 1 |
| 2 | BBB(SELLER ID) | 1 | 5 |
| 3 | A00(MERCHANDISE ID) | 5 | 3 |
| 4 | B00(MERCHANDISE ID) | 0 | 3 |
| 5 | SHIRT | 4 | 1 |
| 6 | LONG SLEEVES | 0 | 0 |
| 7 | SHORT SLEEVES | 4 | 0 |
| 8 | PANTS | 1 | 3 |
| 9 | JEANS | 0 | 0 |
| 10 | CHINO PANTS | 0 | 2 |
| 11 | SKIRT | 3 | 0 |
| 12 | LONG | 0 | 0 |
| 13 | SHORT | 0 | 0 |
| 14 | ¥5,000~¥10,000 | 1 | 0 |
| 15 | ¥10,000~¥15,000 | 0 | 0 |

FIG.6

| RANK | MERCHANDISE INFORMATION | NECESSITY SIGNAL N |
|---|---|---|
| 1 | ④ | 16 |
| 2 | ① | 12 |
| 3 | ② | 11 |
| 4 | ③ | 0 |
| 5 | ⑤ | -1 |

FIG.7

M-ID : MERCHANDISE ID
CM : CHARACTERISTICS OF MERCHANDISE
P : PHOTOGRAPH

| RANK | MERCHANDISE INFORMATION | NECESSITY SIGNAL Na | NECESSITY SIGNAL Nb | TOTAL (Na+Nb) |
|---|---|---|---|---|
| 1 | ① | 12 | 20 | 32 |
| 2 | ④ | 16 | 14 | 30 |
| 3 | ③ | 0 | 13 | 13 |
| 4 | ② | 11 | 0 | 11 |
| 5 | ⑤ | −1 | −1 | −2 |

FIG.10

| RANK | MERCHANDISE INFORMATION | NECESSITY SIGNAL Na | NECESSITY SIGNAL Nb | INDICATION |
|---|---|---|---|---|
| 1 | ④ | 16 | 14 | ○∶<br>○∶ |
| 2 | ① | 12 | 20 | ○ ○<br>○ ○ |
| 3 | ② | 11 | 0 | |
| 4 | ③ | 0 | 13 | ○∶<br>○ |
| 5 | ⑤ | −1 | −1 | · |

FIG.11

E-COMMERCE SYSTEM AND METHOD

BACKGROUND OF THE INVENTION

1. Field of the Invention

The present invention relates to an e-commerce system utilizing information communication networks using electronic, radio and/or optical system as media, and more particularly to an e-commerce system and method enabling ordinary people to purchase merchandise corresponding to celebrity preferences.

2. Description of the Related Art

Conventionally, on the market exist the needs that a consumer desires to purchase merchandise corresponding to preference of a person who interests the consumer. An example of the needs is a case of considering to wear the same merchandise that a celebrity wears to imitate the celebrity. In order to cope with such needs, magazines or the like run feature articles for introducing shops where merchandise that a celebrity wears can be purchased. Further, with the progress of infrastructures on information technology and information networks such as the internet, similar feature articles are run in e-commerce using the information networks.

However, in the case of introducing merchandise that celebrities wear in such a method, there arises a situation where the celebrity privacy is not protected. That is, when a shop is introduced where merchandise that a celebrity wears can be purchased, a situation may occur where the so-called fans of the celebrity rush to the shop, and the celebrity privacy is not protected. Therefore, a case is expected that merchandise that a celebrity recommends is different from the merchandise that the celebrity actually wears. Accordingly, there arises a problem that the methods are not capable of coping with the above-mentioned consumer needs.

Further, in the methods as described above it is expected that merchandise corresponding to temporary celebrity preference at the time the magazine or the like issued be introduced. Accordingly, when the celebrity preference has changed with the passage of time, a case is expected that merchandise recommended by a celebrity in the magazine is different from merchandise that the celebrity currently wears. Also in such a case the problem arises that the methods are not capable of coping with the consumer needs.

SUMMARY OF THE INVENTION

It is an object of the present invention to provide an e-commerce system and method enabling consumers to purchase merchandise corresponding to a current preference of a celebrity while protecting the privacy of the celebrity.

Namely, in an e-commerce system which rearranges merchandise information pieces distributed corresponding to search criteria of the consumer to match with preferences of the consumer based on a personal profile with which various keywords contained in the merchandise information pieces and evaluation values corresponding to the keywords are registered where the evaluation values are learned in advance based on preferences of the consumer, while withdrawing a charge of merchandise from an account designated by the consumer to pay to a seller when receiving an order for the merchandise from the rearranged merchandise information pieces, an order for merchandise from the merchandise information pieces distributed to one consumer (for example, an ordinary person) is placed using the personal profile of another consumer (for example, a celebrity).

Further, the e-commerce system rates the merchandise information pieces distributed to the consumer based on the personal profile to rearrange the merchandise information pieces to match the preference of the consumer.

Furthermore, the e-commerce system ranks the merchandise information pieces according to the rate assigned to each of the merchandise information pieces.

According to the foregoing, by using the personal profile of the different consumer, merchandise information pieces distributed to one consumer can be reflective of preferences of the different consumer. One consumer is thereby capable of purchasing merchandise corresponding to preferences of the different consumer by placing an order for the merchandise based on the merchandise information pieces thus reflective of preferences of the different consumer.

BRIEF DESCRIPTION OF THE DRAWINGS

FIG. 5 is a table showing an example of data in a code dictionary storage section in the information filtering section in the e-commerce system according to the first embodiment;

FIG. 6 is a table showing examples of scores assigned to the example illustrated in FIG. 5;

FIG. 7 is a table showing an example of merchandise information ranked in the merchandise information storage section in the information filtering section in the e-commerce system according to the first embodiment;

FIG. 10 is a table showing an example of merchandise information ranked in the merchandise information storage section in the information filtering section in the e-commerce system according to the second embodiment; and FIG. 11 is another table showing an example of the merchandise information ranked in the merchandise information storage section in the information filtering section in the e-commerce system according to the second embodiment.

DETAILED DESCRIPTION OF THE PREFERRED EMBODIMENTS

Embodiments applying an e-commerce system of the present invention will be described below with reference to accompanying drawings.

(First Embodiment)

Figure 1:
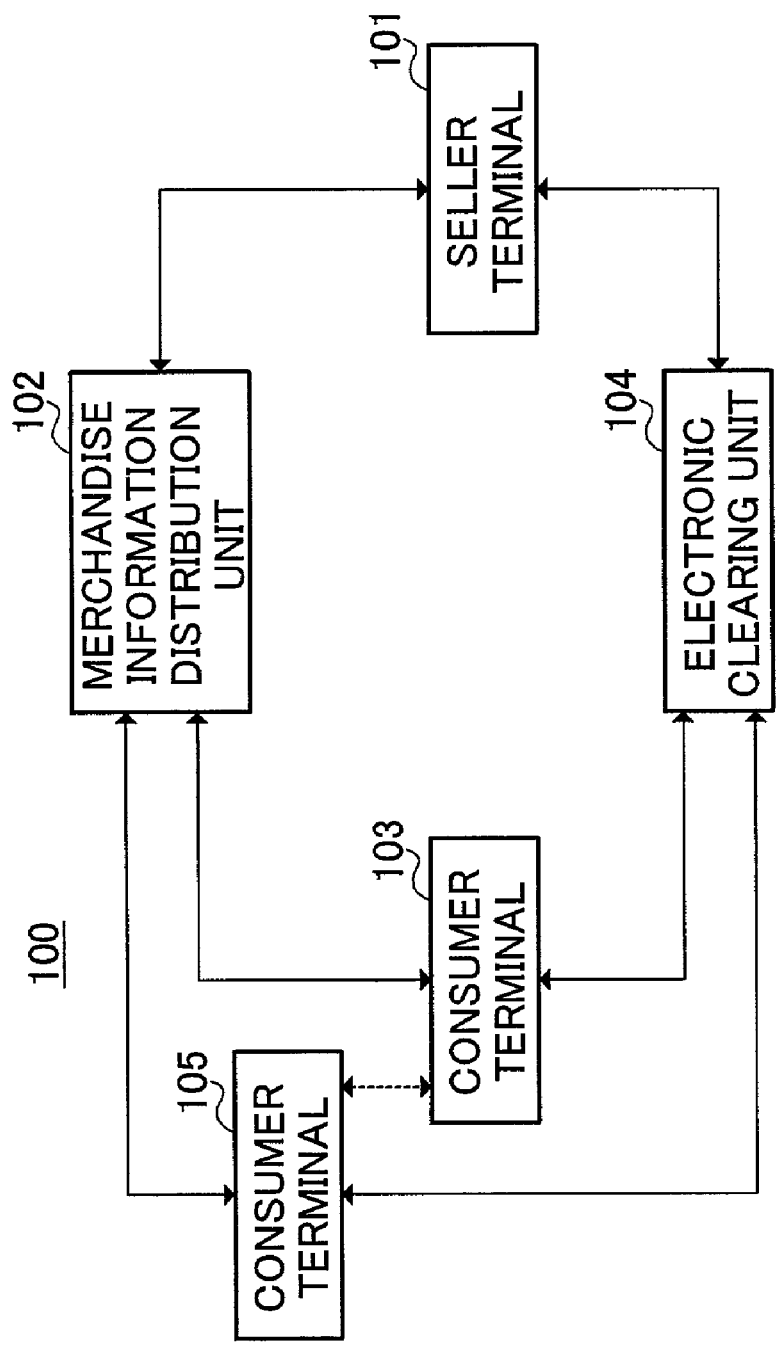
FIG. 1 is a block diagram illustrating a configuration of an e-commerce system according to a first embodiment of the present invention.

FIG. 1 is a block diagram illustrating a configuration of e-commerce system (hereinafter referred to as "EC system") 100 according to the first embodiment of the present invention.

As illustrated in FIG. 1, EC system 100 is comprised of seller terminal 101 for use in registering merchandise information, merchandise information distribution unit 102 that distributes the merchandise information, consumer terminals 103 and 105 for use in watching the merchandise information and placing an order for the merchandise, and electronic clearing unit 104 that clears the transaction on the merchandise.

In EC system 100 it is assumed that a consumer that uses consumer terminal 103 is a specific person (hereinafter referred to as "celebrity"), such as a personality and an opinion leader of a field, who has effects on other people, and that a consumer that uses consumer terminal 105 is one of ordinary people (hereinafter referred to as "ordinary person") who desires to purchase merchandise corresponding to preferences of the celebrity who uses consumer terminal 103. Consumer terminals 103 and 105 are provided with different elements corresponding to differences between the consumers assumed to use the terminals. In other words, consumer terminal 105 is provided with an element for inquiring about celebrity preferences.

Figure 2:
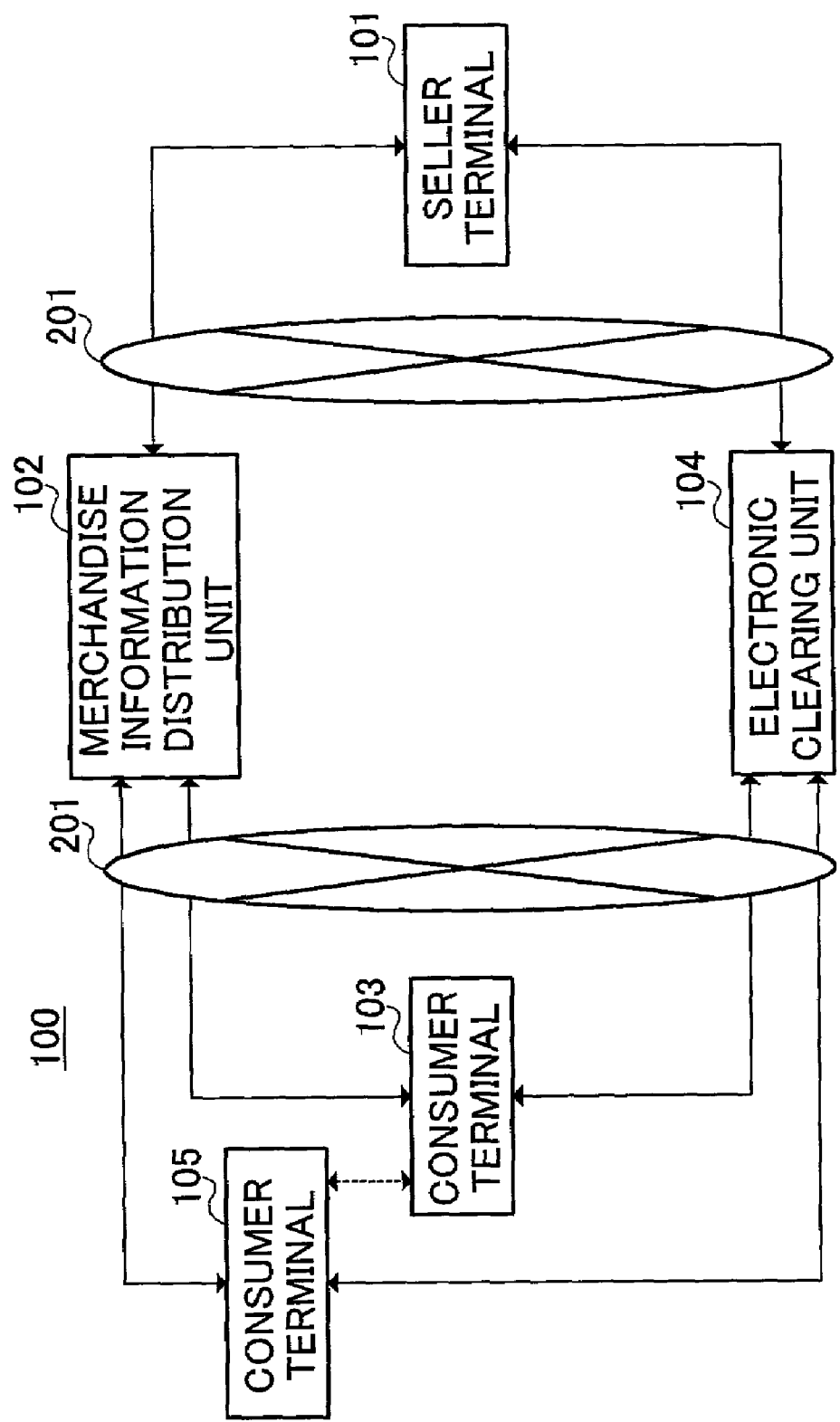
FIG. 2 is a block diagram illustrating the e-commerce system connected through networks according to the first embodiment.

In addition, EC system 100 is actually constructed, as illustrated in FIG. 2, while seller terminal 101 and consumer terminals 103 and 105 are connected with merchandise information distribution unit 102 and electronic clearing unit 104 provided in, for example, a distributor over networks 201 such as the internet. It may also be possible that the distributor is provided with only merchandise information distribution unit 102, and that electronic clearing unit 104 is committed to an external financial institute or the like.

Figure 3:
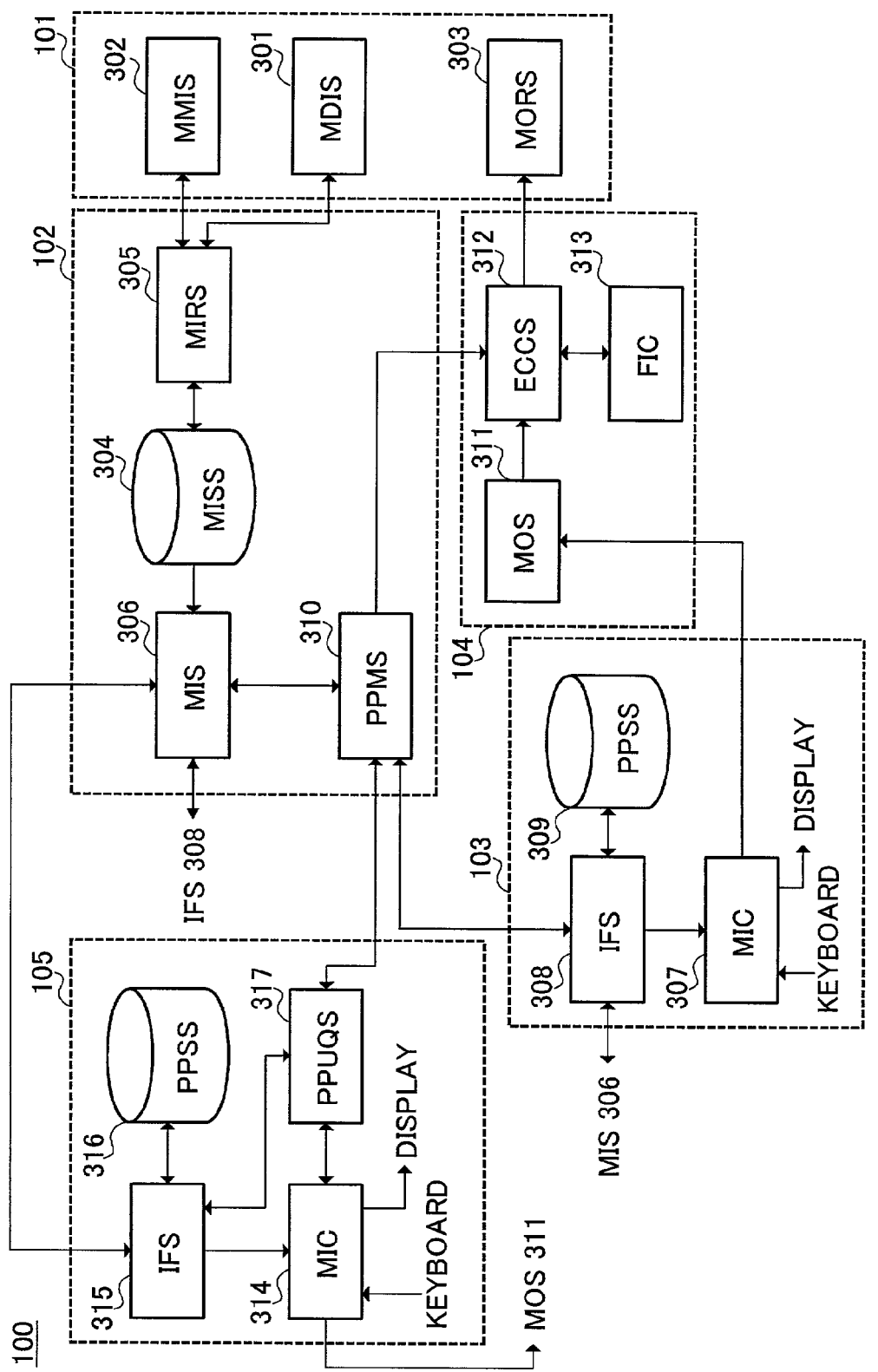
FIG. 3 is a block diagram illustrating a specific configuration of the e-commerce system according to the first embodiment.

A specific configuration of EC system 100 will be described with reference to FIG. 3. FIG. 3 is a block diagram illustrating the specific configuration of EC system 100 according to this embodiment.

In EC system 100 illustrated in FIG. 3, seller terminal 101 is provided with merchandise data input section (MDIS) 301 that inputs merchandise data to merchandise information distribution unit 102, merchandise metadata input section (MMIS) 302 that inputs merchandise metadata to merchandise information distribution unit 102, and merchandise order receiving section (MORS) 303 that receives an order receiving signal including the consumer ID of an orderer and merchandise ID contained in the merchandise information from electronic clearing unit 104.

Merchandise information distribution unit 102 is provided with merchandise information storage section (MISS) 304 that stores the merchandise data and merchandise metadata (hereinafter referred to as "merchandise information") input from seller terminal 101, merchandise information registration section (MIRS) 305 that registers the merchandise information with merchandise information storage section 304, merchandise information server (MIS) 306 that distributes the desired merchandise information to consumer terminal 103 in response to an access from consumer terminal 103, and personal profile managing section (hereinafter referred to as "PPF managing section") (PPMS) 310 described below.

PPF managing section 310 judges whether or not to permit the utilization of a personal profile (hereinafter referred to as "PPF") reflective of preferences of a celebrity on which a request is transmitted from consumer terminal 105 that an ordinary person uses. In addition, PPF will be described specifically later. PPF managing section 310 has the utilization criteria for using PPF of the celebrity which are in advance registered with the section 310, and by examining the utilization criteria, judges whether or not to permit the utilization of PPF. When permitting the utilization of PPF, the section 310 provides the merchandise information transmitted from consumer terminal 105 to information filtering section (IFS) 308. Meanwhile, when not permitting the utilization of PPF, the section 310 returns a signal indicative of not permitting to consumer terminal 105.

Consumer terminal 103 may be achieved by a general personal computer (hereinafter referred to as "PC") which is provided with a calculation processing means such as CPU and a storage means such as RAM and ROM, and which is connected to an input means such as a keyboard and a display means such as a display.

Consumer terminal 103 is provided with merchandise information client (MIC) 307 that receives search criteria of merchandise information to merchandise information server 306 from a user through the input means, while displaying the merchandise information distributed from merchandise information 306. Further, when receiving an order for merchandise from the input means, merchandise information client 307 transmits a merchandise ordering signal to electronic ordering unit 104. Consumer terminal 103 is further provided with information filtering section 308 and personal profile storage section (hereinafter referred to as "PPF storage section") (PPSS) 309 described below.

Information filtering section 308 generates PPF reflective of consumer preferences using the merchandise information distributed from merchandise information server 306 and inputs of the consumer. This PPF generated in information filtering section 308 is stored in PPF storage section 309. The functions of merchandise information client 307, information filtering section 308, and PPF storage section 309 may be achieved by CPU executing a program stored in ROM of consumer terminal 103. At this time, RAM may be used as an operation area when necessary.

Figure 4:
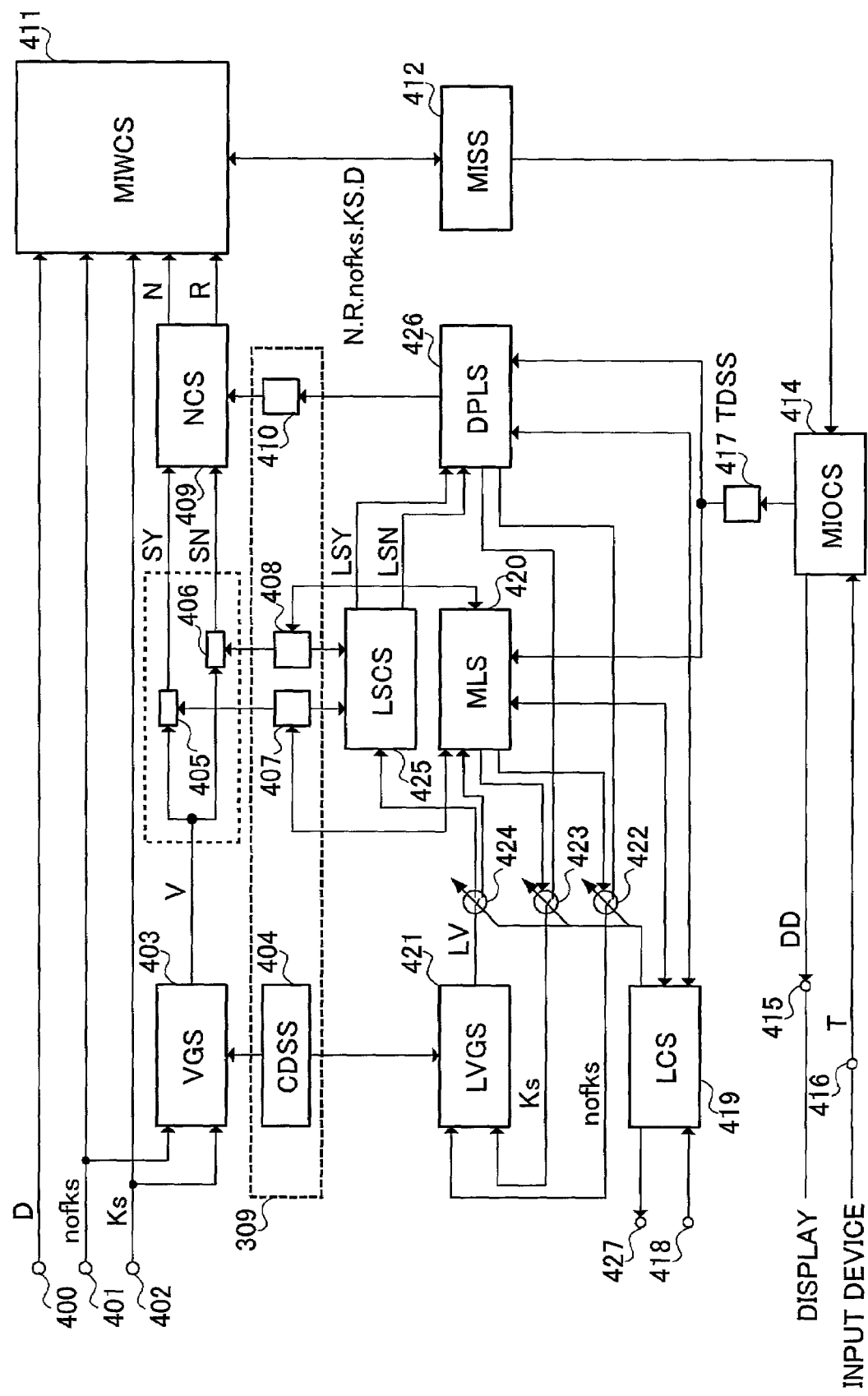
FIG. 4 is a block diagram illustrating a specific configuration to indicate the relationship between an information filtering section and a PPF storage section in a consumer terminal in the e-commerce system according to the first embodiment.

With reference to FIG. 4, the relationship between information filtering section 308 and PPF storage section 309 will be described. FIG. 4 is a block diagram illustrating a specific configuration with respect to the relationship between information filtering section 308 and PPF storage section 309.

Information filtering section 308 is associated with PPF storage section 309 in two kinds of processing, i.e., filtering processing on the merchandise information and learning processing on the merchandise information. The filtering processing is such processing that rearranges pieces of the merchandise information distributed from merchandise information server 306 according to PPF reflective of consumer (celebrity) preference. Concretely, The filtering processing is such processing that rearranges pieces of the merchandise information distributed from merchandise information server 306 by rating pieces of the merchandise information based on the PPF. It is preferable that rearrangement of pieces of the merchandise information are ranked according to the rate assigned to each of the merchandise information pieces. Specially, in this embodiment is described the case where pieces of the merchandise information distributed from merchandise information server 306 is ranked based on the PPF. The learning processing is such processing that learns PPF for use in performing the filtering processing. In addition, the learning processing is further performed, for example, in placing an order on the merchandise information.

The filtering processing on the merchandise information in information filtering section 308 will be described first.

When a consumer accesses to merchandise information server 306 to search the merchandise information and receives the merchandise information distributed from merchandise information server 306, as illustrated in FIG. 4, input to information data input terminal 400 is the merchandise information comprised of the merchandise data and merchandise metadata to be evaluated, input to number-of-keyword signal input terminal 401 is a number-of-keyword signal nofks indicative of the number of keywords contained in the merchandise information, and input to keyword signal input terminal 402 is keyword group signal Ks comprised of a plurality of keywords. The keyword group signal Ks is comprised of keywords contained in the merchandise information.

Vector generating section (VGS) 403 transforms the keyword group signal Ks from character sequences to a vector signal V. In order to transform the character sequences to the vector signal V, a character sequence is employed of a code dictionary signal stored in code dictionary storage section (CDSS) 404. Code dictionary storage section 404 stores character sequences of keywords of various merchandise in the form of code dictionary signals. When the same character sequence as a character sequence of a jth code dictionary signal is detected from the keyword group signal Ks, "1" is input to a jth vector component of the vector signal V. When the same character sequence as the character sequence of the jth code dictionary signal is not detected, "0" is input to the jth vector component of the vector signal V. Similar processing is repeated with respect to all the components of the vector signal V.

The keywords for "clothing" will be specifically described. In code dictionary storage section 404 are stored character sequences such as "shirt", "long sleeves", "short sleeves", "jeans", "chino pants", "skirt", "long", "short", "¥5,000~¥10,000", and "¥10,000~¥15,000" in addition to the seller ID and merchandise ID. FIG. 5 is a table showing an example of data in code dictionary storage section 404 that stores the relationship between the character sequences of these keywords and the code dictionary signals.

Positive signal calculating section 405 calculates, using a positive metric signal, a positive signal SY such that a value thereof is large when the keyword group signal Ks contains a large number of keywords such that the consumer previously replied the keyword interested the consumer. Negative signal calculating section 406 calculates, using a negative metric signal, a negative signal SN such that a value thereof is large when the keyword group signal Ks contains a large number of keywords such that the consumer previously replied that the keyword did not interest the consumer.

The positive metric signal stored in positive metric storage section 407 is determined based on the keyword group signal Ks and a result of the reply indicative of that the consumer has an interest. The negative metric signal stored in negative storage section 408 is determined based on the keyword group signal Ks and a result of the replay indicative of that the consumer has no interest.

The positive metric signal and negative metric signal each are assigned a value (hereinafter referred to as "score") corresponding to presence or absence of consumer's interest in relation to each keyword. Assuming, in the above-mentioned specific example, that the consumer previously replied having an interest in the merchandise information containing "shirt" that is the keyword, the score corresponding to the number of times having an interest was replied is assigned to "shirt". Further assuming a simple example such that having an interest was replied four times, the score of 4 is assigned to "shirt". In contrast thereto, when the consumer previously replied having no interest or hating, the score corresponding to the number of times having no interest was replied is assigned to "shirt".

FIG. 6 is a table showing examples of scores assigned to the specific example in FIG. 5. The positive signal SY and negative signal SN are obtained by calculating scores assigned corresponding to respective keywords.

Using the positive signal SY and negative signal SN, necessity calculating section (NCS) 409 calculates a necessity signal N according to an equation of N=SY−C·SN and further calculates a reliability signal R according to another equation of R=C·SY+SN. The coefficient C is used to separate the merchandise information into pieces of the information that interested the consumer and pieces of the information that did not interest the consumer, and is provided from determination parameter storage section 410. The necessity signal N and reliability signal R have a large value when there are a large number of keywords contained in the merchandise information such that the consumer previously replied having an interest therein, and there are few keywords contained in the merchandise information such that the consumer previously replied having no interest therein. Each of pieces of the merchandise information distributed from merchandise information server 306 is rated based on the PPF by calculating the necessity signal N and reliability signal R at necessity calculating section 409.

PPF storage section 309 is comprised of code dictionary storage section 404, positive metric storage section 407, negative metric storage section 408, and determination parameter storage section 410 described above. In addition, various data to be stored in code dictionary storage section 404, positive metric storage section 407, negative metric storage section 408, and determination parameter storage section 410 is stored in the learning processing described later. It is herein assumed that appropriate data subjected to the learning processing is already stored in the above sections.

Merchandise information write control section (MIWCS) 411 ranks the merchandise information pieces according to the rate assigned to each of the merchandise information pieces to write in merchandise information storage section (MISS) 412. In merchandise information storage section 412 are arranged and stored the merchandise information pieces in descending order of a value of the necessity signal N.

FIG. 7 is a table showing examples of the merchandise information pieces ranked in merchandise information storage 412 after learning preferences on "clothing" of a person. FIG. 7 illustrates a case of using the merchandise information pieces containing keywords described below shown in FIGS. 5 and 6, where the coefficient C is "1":

Merchandise information ①: AAA (seller ID), A00 (merchandise ID), shirt and long sleeves;
Merchandise information ②: AAA (seller ID), skirt and ¥5,000 to ¥10,000;
Merchandise information ③: BBB (seller ID), skirt and ¥5,000 to ¥10,000;
Merchandise information ④: AAA (seller ID), A00 (merchandise ID), shirt and half sleeves; and
Merchandise information ⑤: BBB (seller ID), skirt and ¥10,000 to ¥15,000.

In this case, in merchandise information storage section 412 are stored the merchandise information pieces in the order as shown in FIG. 7. In other words, according to the equation of the necessity signal described previously, necessity signals N are calculated as follows:

Merchandise information ④: $\{8+5+4+4\}(SY)-\{1\}(C)\cdot\{1+3+1+0\}(SN)=16(N)$;
Merchandise information ①: $\{8+5+4+0\}(SY)-\{1\}(C)\cdot\{1+3+1+0\}(SN)=12(N)$;
Merchandise information ②: $\{8+3+1\}(SY)-\{1\}(C)\cdot\{1+0+0\}(SN)=11(N)$;
Merchandise information ③: $\{1+3+1\}(SY)-\{1\}(C)\cdot\{5+0+0\}(SN)=0(N)$; and
Merchandise information ⑤: $\{1+3+0\}(SY)-\{1\}(C)\cdot\{5+0+0\}(SN)=-1(N)$.

Therefore, the merchandise information pieces ① to ⑤ are ranked and stored as shown in FIG. 7.

Merchandise information output control section (MIOCS) 414 uses the merchandise information pieces ranked and stored in merchandise information storage section 412 to generate a predetermined learning and ordering screen, and transfers the screen to merchandise information client 307 through merchandise information output terminal 415. Merchandise information client 307 displays this learning and ordering screen on, for example, a display of consumer terminal 103. In addition, the learning and ordering screen will be described later along with the learning processing.

Thus, when receiving the merchandise information pieces distributed from merchandise information server 306, a consumer is capable of watching the merchandise information pieces ranked according to previous inputs of the consumer indicative of interests or no interests thereof, using the display or the like of consumer terminal 103 without performing particular processing. As a result, the consumer is capable of placing an order for merchandise based on the merchandise information pieces ranked according to the preferences of the consumer.

The learning processing in information filtering section 308 will be described below. A preferable example of information filtering section 308 is an information filtering apparatus disclosed in Japanese Laid-open Patent Publication HEI9-288683. In order to simplify the explanation, the simplest configuration is herein used to explain.

When information filtering section 308 receives a learning request from a consumer through merchandise information client 307, the section 308 accesses to merchandise information server 306 to request the distribution of the merchandise information according to search criteria and the like contained in the learning request. Information filtering section 308 receives the merchandise information distributed from merchandise information server 306 in response to the distribution request.

The learning processing is such processing that learns PPF indicative of preferences of a consumer by analyzing keywords contained in the merchandise information, where the consumer inputs whether or not he/she has an interest in the merchandise information distributed from merchandise information server 306. By performing the learning processing, PPF is stored in positive metric storage section 407 and negative metric storage section 408.

Figure 8:
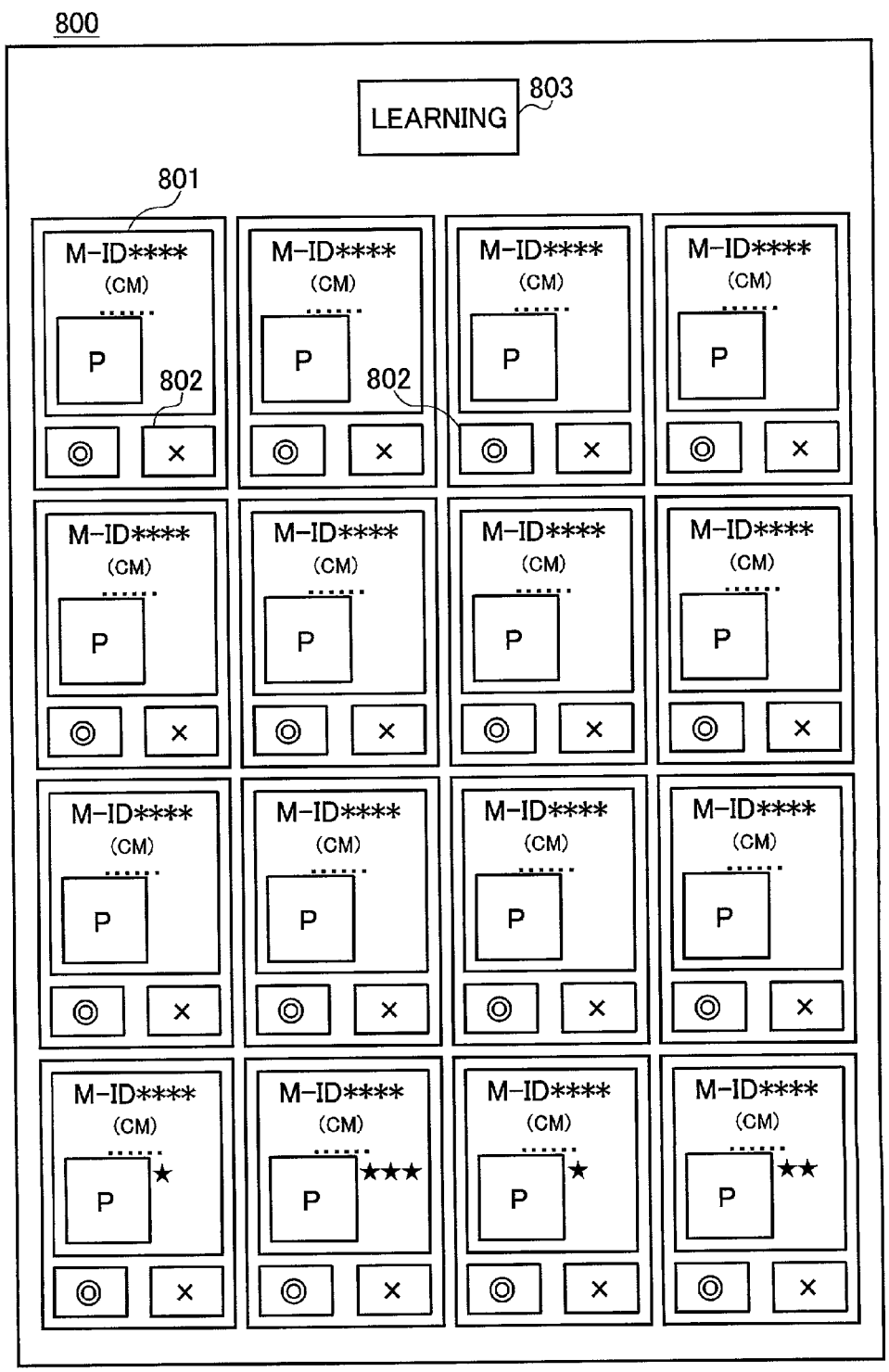
FIG. 8 is a diagram illustrating an example of a learning and ordering screen generated by a merchandise information output control section in the information filtering section in the e-commerce system according to the first embodiment.

When the learning processing has been already performed, information filtering section 308 ranks the distributed merchandise information pieces in the same way as in the filtering processing described above according to the stored PPF, and generates learning and ordering screen 800 as illustrated in FIG. 8. PPF is further updated according to a learning instruction of a consumer through learning and ordering screen 800. An ordering instruction input through learning and ordering screen 800 is also subject to the learning processing on PPF.

In the step where the learning processing is not performed, PPF is not stored in positive metric storage section 407 and negative metric storage section 408. Accordingly, since it is not possible to perform the above processing, merchandise information pieces are written in merchandise information storage section 412 without being ranked. Merchandise information output control section 414 generates learning and ordering screen 800 illustrated in FIG. 8 using a plurality of merchandise information pieces written in merchandise information storage section 412. This learning and ordering screen 800 is transferred to merchandise information client 307 through merchandise information output terminal 415. Merchandise information client 307 displays this learning and ordering screen on the display or the like of consumer terminal 103.

As illustrated in FIG. 8, learning and ordering screen 800 is comprised of a plurality of merchandise information pieces 801, buttons 802 (shown with "◎" and "×") for use in inputting "yes" or "no" as to whether a consumer is interested in each merchandise information piece, and learning button 803. Each of merchandise information pieces 801 includes merchandise ID (M-ID), characteristics of merchandise (CM) and photograph (P). In addition, selecting a merchandise information piece places an order for the piece of the merchandise. In addition, a screen for use in performing the learning and ordering is not limited to a configuration illustrated in FIG. 8. For example, different screens may be provided as a screen for the learning and a screen for the ordering.

When the learning processing is performed, a consumer selects button 802 based on merchandise information 801 on learning and ordering screen 800 displayed on the display or the like of consumer terminal 103, and thereby inputs as to presence or absence of interest. Then, selecting learning button 803 after finishing the input on the interests transmits the learning instruction to information filtering section 308.

The learning instruction contains a teaching signal T to each merchandise information piece. The teaching signal T is a signal indicative of an interest or no interest of a consumer in each merchandise information piece. When information filtering section 308 receives the learning instruction through learning data input terminal 416, the section 310 fetches the teaching signal T transmitted along with the learning instruction. The teaching signal T is stored in teaching data storage section (TDSS) 417 through merchandise information output control section 414. Each teaching signal T is stored in teaching data storage section 417 along with the keyword group signal Ks and number-of-keyword signal nofKs assigned to each merchandise information piece.

After the teaching signal T and the others are stored in teaching data storage section 417, a learning start signal is input to learning start signal input terminal 418. When the learning start signal is input, learning control section (LCS) 419 makes switches 422, 423 and 424 made to connect metric learning section (MLS) 420 and learning vector generating section (LVGS) 421.

Metric learning section 420 fetches the teaching signal T, keyword group signal Ks and number-of-keyword signal nofKs from teaching data storage section 417, and inputs the keyword group signal Ks and number-of-keyword signal nofKs to learning vector generating section 421. Learning vector generating section 421 transforms the keyword group signal Ks to a learning vector signal LV using the code dictionary signal as well as vector generating section 403.

The learning vector signal LV is input to metric learning section 420. Metric learning section 420 corrects the positive metric signal in positive metric storage section 407 based on the learning vector signal LV corresponding to the teaching signal T indicative of having an interest, while correcting the negative metric signal in negative metric storage section 408 based on the learning vector signal LV corresponding to the teaching signal T indicative of having no interest.

The positive metric signal thereby has a large value with respect to the keywords included in the merchandise information piece that interests the consumer. Similarly, the negative metric signal thereby has a large value with respect to the keywords included in the merchandise information piece that hates the consumer.

Learning score calculating section (LSCS) 425 operates in a similar way to that in positive signal calculating section 405 and negative signal calculating section 406 to calculate a learning positive signal LSY and a learning negative signal LSN from the learning vector signal LV. Using the learning positive signal LSY and learning negative signal LSN, determination plane learning section (DPLS) 426 obtains the coefficient C that most accurately separates merchandise information pieces that interest the consumer and that do not interest the consumer. The coefficient C is expressed on a two-dimensional space using the positive signal SY and negative signal SN. The obtained coefficient C is stored in determination parameter storage section 410. Storing the coefficient C in determination parameter storage section 410 finishes the learning processing. When the learning processing is finished, learning control section 419 outputs a learning finish signal from learning finish signal output terminal 427.

After confirming that the learning finish signal is output, merchandise information write control section 411 inputs again each merchandise information piece, and the keyword group signal Ks and number-of-keyword signal nofks each assigned to the merchandise information piece stored in merchandise information storage section 412 to respective input terminals 400, 401 and 402. As a result, with respect to each merchandise information piece, the necessity signal N which is accurately reflective of interests (preference and taste) of the consumer is calculated based on the keywords assigned to the merchandise information piece. The merchandise information pieces are rearranged in descending order of the necessity signal N to be stored again in merchandise information storage section 412. Merchandise information output control section 414 fetches the merchandise information pieces from merchandise information storage section 412, generates learning and ordering screen 800 with the merchandise information pieces rearranged in descending order of the necessity signal N, and transfers the generated screen to merchandise information client 307. Merchandise information client 307 displays this learning and ordering screen on the display or the like connected to consumer terminal 103.

The consumer inputs a preference again if necessary, while watching the rearranged merchandise information pieces, and thereby searches the merchandise information matching with the consumer's preferences. By thus inputting "yes" or "no" on whether or not each distributed merchandise information piece interests the consumer, the consumer is capable of obtaining PPF matching with the consumer's preferences. In this case, PPF matching with the preferences of a celebrity that is the consumer is stored in PPF storage section 309.

The filtering processing on the merchandise information is thus performed using PPF reflective of consumer preferences, whereby it is possible to automatically decrease the evaluation on the merchandise information distributed from malicious sellers. For example, a case is considered that in order to increase a search hit rate of its own merchandise, a malicious seller inputs merchandise information that is not directly associated with the merchandise. In this case, when a consumer inputs "hate" in such merchandise information, the merchandise information containing the seller ID indicative of such a seller is assigned a negative score in PPF. It is thereby possible to automatically decrease the evaluation on the merchandise information distributed from such a seller. In other words, it is possible to provide an EC system such that consumers are capable of supervising distributed merchandise information, and to automatically increase the evaluations on sellers that distribute good merchandise information.

In addition, it is preferable to generate PPF as described above using the merchandise information distributed from merchandise information server 306 and the teaching signal T reflective of consumer preferences. However, the present invention is not limited to the foregoing, as long as consumer preferences are reflected. For example, it may be possible to generate PPF using only consumer preferences input according to a menu displayed on an internet browser.

In this embodiment is described the case where consumer terminal 103 is provided with PPF storage section 309 and grasps PPF. However, the present invention is not limited to the above case, and it may be possible that merchandise information distribution unit 102 is provided with a storage means corresponding to PPF storage section 309 to grasp PPF of a consumer operating consumer terminal 103. However, in consideration of characteristics of PPF designed to be indicative of consumer preferences, it is preferable that PPF be provided on a side of consumer terminal 103 from the standpoint of protecting the privacy.

Also when merchandise information pieces are provided while the utilization of PPF by an ordinary person is permitted in PPF managing section 310 in merchandise information distribution unit 102 as described previously, information filtering section 308 similarly ranks the merchandise information pieces based on PPF stored in PPF storage section 309. Then, the section 308 returns the ranked merchandise information pieces to PPF managing section 310. PPF managing section 310 transmits the ranked merchandise information pieces to the ordinary person permitted to utilize PPF.

As well as consumer terminal 103, consumer terminal 105 may be achieved by a general PC which is provided with a calculation processing means such as CPU and a storage means such as RAM and ROM, and which is connected to an input means such as a keyboard and a display means such as a display.

Further, consumer terminal 105 is provided with merchandise information client (MIC) 314, information filtering section (IFS) 315 and PPF storage section (PPSS) 316 each having the same function as that in consumer terminal 103. Accordingly, an ordinary person using consumer terminal 105 is also capable of ranking merchandise information pieces distributed from merchandise information server 306 based on PPF corresponding to preferences of the person, and placing an order for merchandise from the ranked merchandise information pieces.

In addition, information filtering section 315 has a function for switching using PPF of an ordinary person or using PPF of a celebrity according to an instruction of a user. The user instructs such switching to information filtering section 315 through merchandise information client 314 from the keyboard or the like of consumer terminal 105.

Furthermore, consumer terminal 105 is provided with personal profile utilization querying section (hereinafter referred to as "PPF utilization querying section") (PPUQS) 317 for querying whether PPF of the celebrity is permitted to PPF managing section 310 of merchandise information distribution unit 102. PPF utilization querying section 317 queries on the utilization of PPF corresponding to an instruction of an ordinary person that is a consumer. The ordinary person provides the instruction to PPF utilization querying section 317 through merchandise information client 314 from the keyboard and the like of consumer terminal 105. When PPF utilization querying section 317 queries whether PPF of the celebrity is permitted, the section 317 transmits utilization information. For example, the utilization information includes information for proving a membership registered with a fan club of the celebrity to which the ordinary person belongs.

When the utilization of PPF of the celebrity is permitted, PPF utilization querying section 317 receives from information filtering section 315 the merchandise information distributed from merchandise information server 306 corresponding to search criteria designated by the ordinary person, and transmits the merchandise information to PPF managing section 310 of merchandise information distribution unit 102. At the same time, PPF utilization querying section 317 transmits to PPF managing section 310 a signal (hereinafter referred to as "PPF utilization signal") including a consumer ID indicative of the person and a consumer ID indicative of the celebrity permitting the initialization of PPF. The PPF utilization signal is provided to an EC clearing section, described later, of electronic clearing unit 104 through PPF managing section 310. On the other hand, when PPF utilization querying section 317 receives the rejection on the utilization of PPF of the celebrity, a message indicative of the rejection or a utilization permission application form is indicated on the display.

Electronic clearing unit 104 is provided with EC clearing section 312 that receives a merchandise ordering signal from merchandise information client 307 (314) through merchandise ordering section (MOS) 311.

EC clearing section (ECCS) 312 inquires of financial institute or company (FIC) 313 whether an orderer has an ability to pay for the merchandise in response to the merchandise ordering signal. When the orderer has the ability to pay, the section 312 transmits an order receiving signal to merchandise order receiving section 303. At the same time, the section 312 withdraws the merchandise charge from an account of the orderer. Meanwhile, when the section 312 receives the PPF utilization signal from PPF managing section 310, the section 312 withdraws the PPF utilization charge from an account of the ordinary person who uses PPF of the celebrity. Further, the section 312 pays the PPF utilization charge to an account of the celebrity who permits the utilization of PPF.

In addition, it is assumed herein that each celebrity uses consumer terminal 103 in EC system 100, which is achieved by that an ordinary person purchases merchandise while referring to merchandise information pieces ranked according to PPF that is registered according to the utilization of the celebrity. Accordingly, it is naturally required to explain the concept of EC system 100 to the celebrity to gain its cooperation. Further, it is preferable for an agent who manages merchandise information distribution unit 102 or the like to promote the utilization of consumer terminal 103 by lending consumer terminals 103 to the celebrity at no charge or paying utilization charges for the utilization of consumer terminal 103 to the celebrity.

When paying the utilization charge of consumer terminal 103 to the celebrity, it is preferable to pay a charge corresponding to the utilization. In this case, it is considered that when EC clearing section 312 receives a merchandise ordering signal from consumer terminal 103 used by the celebrity, the section 312 pay the utilization charge of consumer terminal 103, instead of withdrawing the charge of the merchandise.

Further, from the standpoint of promoting the utilization of consumer terminal 103, it is effective to adopt a system for permitting the celebrity to purchase merchandise corresponding to a predetermined price (for example, ¥500,000 per month) after gaining permission of sellers using EC system 100.

When the system has the celebrity use the terminal 103 in this way, PPF of the celebrity is registered so as to increase scores of keywords assigned to the merchandise information of the seller from which the celebrity purchased the merchandise. The existence of ordinary people desiring to purchase merchandise matching with preferences of the celebrity increases the possibility that the merchandise of the seller is purchased. Accordingly, with considering the utilization charge as a charge for advertising the merchandise to ordinary people who want to purchase the merchandise using PPF of the celebrity, since a seller is considered to advertise the merchandise of the seller by using PPF reflective of preferences of a celebrity, also the seller is capable of obtaining adequate benefits.

With reference to FIG. 3, the operation will be described below when an ordinary person as a consumer of consumer terminal 105 places an order for merchandise using PPF of a celebrity as a consumer of consumer terminal 103. In addition, it is assumed herein that PPF storage section 309 of consumer terminal 103 already stores PPF reflective of preferences of the celebrity.

An ordinary person who desires to use PPF of the celebrity instructs information filtering section 315 whether to use PPF of the person stored in PPF storage section 316 or to use PPF of the celebrity, from the keyboard or the like of consumer terminal 105 through information client 314. It is assumed herein that the utilization of PPF of the celebrity is instructed.

At the same time as the instruction, the ordinary person designates search criteria of merchandise information that interests the person, from the keyboard or the like of consumer terminal 105 through merchandise information client 314. Information filtering section 315 accesses to merchandise information server 306 according to the search criteria and receives distribution of the corresponding merchandise information.

When the utilization of PPF of the celebrity is instructed, PPF utilization querying section 317 queries whether the utilization of PPF is permitted to PPF managing section 310 of merchandise information distribution unit 102. PPF managing section 310 examines the utilization information of the ordinary person transmitted with such a query to judge whether the utilization of PPF is permitted. It is herein assumed that the utilization of PPF of the celebrity is permitted.

When the utilization of PPF is permitted, information filtering section 315 transmits merchandise information pieces distributed from merchandise information server 306 to PPF managing section 310 through PPF utilization querying section 317.

PPF managing section 310 provides the merchandise information pieces from consumer terminal 105 to information filtering section 308 of consumer terminal 103. Information filtering section 308 performs the filtering processing described previously on the merchandise information pieces using PPF stored in PPF storage section 309. The merchandise information pieces searched according to the search criteria designated by the ordinary person are thereby ranked according to PPF reflective of preferences of the celebrity.

After finishing the ranking (filtering processing) of the merchandise information pieces, information filtering section 308 returns the merchandise information pieces to PPF managing section 310. Then, the merchandise information pieces are returned to PPF utilization querying section 317 of consumer terminal 105.

PPF utilization querying section 317 provides the merchandise information pieces thus ranked according to the preferences of the celebrity to information filtering section 315. When information filtering section 315 receives the ranked merchandise information pieces, the section 315 provides the merchandise information pieces to merchandise information client 314 without performing any processing thereon. Merchandise information client 314 displays the merchandise information pieces on the display or the like of consumer terminal 105. At this point, the display or the like indicates the information pieces in the form of the learning and ordering screen illustrated in FIG. 8. Thus, the merchandise information pieces, which are searched according to search criteria designated by the ordinary person and then ranked according to the preferences of the celebrity, are indicated on the display or the like of consumer terminal 105.

When the merchandise information pieces are indicated on the display or the like, the ordinary person selects a piece of merchandise to place an order therewith in the same way as in the general processing. At this point, the merchandise information pieces are ranked according to the preferences of the celebrity. Therefore, the ordinary person is capable of purchasing a piece of merchandise corresponding to the preferences of the celebrity from merchandise information pieces searched according to the search criteria that the person designated.

In addition, when ranking the merchandise information pieces according to the preferences of the celebrity, information filtering section 308 of consumer terminal 103 receives the merchandise information pieces from consumer terminal 105 and performs the filtering processing on the received merchandise information pieces. Then, the section 308 returns only a result (ranked merchandise information pieces) of the filtering processing to consumer terminal 105. Therefore, a case never occurs that PPF of reflective of the preferences of the celebrity is opened to public. It is thereby possible to assuredly protect the privacy of the celebrity.

In addition, when merchandise information pieces are ranked according to preferences of a celebrity, it is considered that PPF of the celebrity be downloaded from consumer terminal 103 and that information filtering section 315 of consumer terminal 105 perform the filtering processing on PPF. In this case, since data provided as PPF are of scores corresponding to keywords contained in the merchandise information pieces, the downloading does not directly disturb the protection of the privacy. However, in order to assuredly protect the privacy of a celebrity, it is preferable that consumer terminal 103 performs the filtering processing as described in this embodiment.

Thus, according to EC system 100 according to the first embodiment, using PPF reflective of preferences of a celebrity, merchandise information pieces searched with search criteria designated by an ordinary person are ranked. It is thereby possible for the ordinary person to purchase merchandise corresponding to preferences of the celebrity by placing an order for the merchandise based on the ranked merchandise information pieces. In addition, the ranking of merchandise information pieces is performed in consumer terminal 103 used by the celebrity. Accordingly, it is possible to protect the privacy of the celebrity while allowing the purchase of merchandise matching with preferences of the celebrity.

Further, PPF reflective of preferences of a celebrity is registered easily by the celebrity selecting merchandise pieces through consumer terminal 103. Accordingly, it is not necessary to handle an interview of a magazine or the like, and therefore preferences of a celebrity can be reflected in a short time. As a result, since current preferences of the celebrity are reflected, it is possible to cope with the problem that the celebrity preference changes with the passage of time. It is thereby possible to purchase the merchandise corresponding to the current preferences of the celebrity.

In addition, in this embodiment is described the case where EC system 100 is only connected to consumer terminal 105 that an ordinary person uses and consumer terminal 103 that a celebrity uses. However, it is actually expected that the system 100 be connected to a plurality of consumer terminals used by a plurality of celebrities as well as ordinary people. In this case, PPF managing section 310 presents a list of celebrities permitting the utilization of their PPF to ordinary people who query on the permission of the utilization of PPF. Meanwhile, it is preferable to enable ordinary people to designate a celebrity through merchandise information client 314.

Further, in this embodiment is described the case where merchandise information pieces searched with search criteria designated by an ordinary person are ranked corresponding to preferences of a celebrity. However, the present invention is not limited to the ranking of the merchandise information, and any means maybe possible which is capable of conveying preferences of a celebrity to ordinary people. How to display the merchandise information pieces on the display means is not limited in particular as long as the pieces are displayed corresponding to preferences of a celebrity. One of example is to display merchandise information pieces ranked corresponding to preferences of a celebrity. Namely, changing a way of indication of merchandise information pieces corresponding to preferences of a celebrity is included in the gist of an e-commerce system of the present invention. For example, it may be possible to assign a specific mark indicative of the degree of interest of a celebrity to the distributed merchandise information.

This case may be, for example as illustrated in the lowest columns in FIG. 8, achieved by assigning the specific mark indicative of the degree of interest of a celebrity to an area of each merchandise information 801 of the learning and ordering screen. In the figure, as the simplest case, a number of marks of ★ corresponding to the degree of interest of a celebrity are assigned. In other words, the merchandise information with a larger number of marks of ★ indicates that the degree of interest therein of a celebrity is greater. This case enables the judgment on preferences of a celebrity without performing the ranking according to preferences of a celebrity like this embodiment.

Further, EC system 100 is based on the premise that a celebrity uses consumer terminal 103. Therefore, when the celebrity places an order for the merchandise using the terminal 103, a seller of merchandise is capable of recognizing the order from the consumer ID and so on contained in the merchandise ordering signal. Accordingly, based on the premise that the seller gains permission of the celebrity, it is possible for the seller to change the merchandise metadata assigned to the merchandise based on the fact that the celebrity purchased the merchandise. For example, the seller is capable of inputting the merchandise metadata of a "favorite of celebrity A".

According to EC system 100, since it is possible to change the merchandise metadata corresponding to the shopping trend of a celebrity, it is possible to present merchandise information more valuable to consumers. Further, since the merchandise information more valuable to consumers is presented, sellers are capable of expecting increases in sales of merchandise. In addition, with respect to a piece of merchandise on which a celebrity replies the merchandise "does not match with the celebrity taste", since there is a possibility of having an adverse effect on purchase trends, it is preferably to adopt a configuration for indicating only pieces of merchandise matching with the taste without indicating pieces of merchandise not matching with the taste.

Further, the merchandise metadata assigned to the merchandise purchased by a celebrity may be analyzed to reflect the analysis result in the merchandise metadata of another piece of merchandise. In this case, when a consumer exists who uses PPF of the celebrity, it is expected that the another piece of merchandise reflective of the analysis result is placed also in a higher rank. Therefore, the possibility that the another piece of merchandise is purchased is increased, and increases in sales are expected.

Furthermore, in this embodiment is described the case where PPF managing section 310 that judges whether or not to permit an ordinary person to use PPF is provided in merchandise information distribution unit 102. However, the present invention is not limited to the above case, and it may be possible to provide PPF managing section 310 in consumer terminal 103 that a celebrity uses. When thus changing, since consumer terminal 103 that the celebrity uses is capable of managing the utilization criteria of PPF of the celebrity, it is possible to provide EC system 100 more excellent in protecting the privacy.

In addition, while in this embodiment is described the case where consumer terminal 103 (105) is provided with information filtering section 308 (315) and PPF storage section 309 (316), the present invention is not limited to the above case. In other words, it may be possible that merchandise information distribution unit 102 is provided with all the structural elements except merchandise information client 307 (314) and that consumer terminal 103 (105) is provided with only merchandise information client 307 (314) with the WEB browsing function. In this case, even with consumer terminal 103 (105) with only the WEB browsing function and with no specific other configuration, consumers are capable of joining EC system 100.

(Second Embodiment)

In the first embodiment, information filtering section 315 of consumer terminal 105 switches selectively using PPF of the terminal 105 (ordinary person) or using PPF of another person (celebrity). In contrast thereto, in EC system 200 according to the second embodiment, information filtering section 901 of consumer terminal 105 uses both PPFs (of ordinary person and celebrity), and in this respect, differs from the first embodiment.

Figure 9:
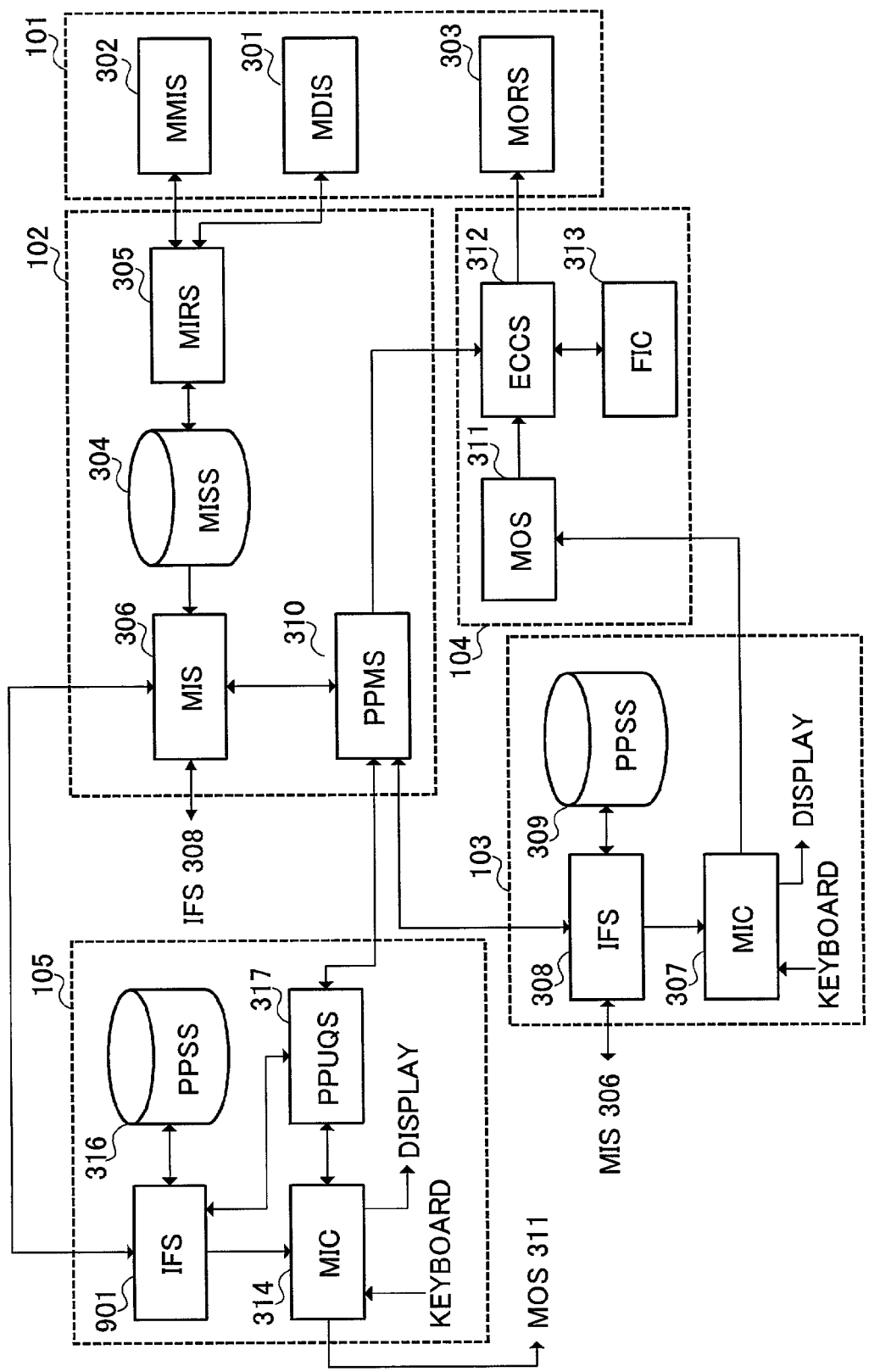
FIG. 9 is a block diagram illustrating a specific configuration of an e-commerce system according to a second embodiment of the present invention.

FIG. 9 illustrates a specific configuration of EC system 200 according to the second embodiment. Since FIG. 9 illustrates the same configuration as FIG. 3 except information filtering section 901 of consumer terminal 105, descriptions on the configuration except information filtering section 901 are omitted.

In addition, the specific configuration of information filtering section 901 is basically the same as the configuration illustrated in FIG. 4. However, merchandise information write control section 411 is different in being further provided with a function corresponding to the feature for using PPFs of both an ordinary person and celebrity as described above.

As described above, information filtering section 901 uses PPFs of both an ordinary person and celebrity. Information filtering section 901 thereby reflects preferences of both the ordinary person and celebrity in merchandise information pieces distributed from merchandise information server 306. Accordingly, the merchandise information pieces are ranked corresponding to preferences of both the ordinary person and celebrity.

As functions for reflecting preferences of both the ordinary person and celebrity in merchandise information pieces, information filtering section 901 has, for example, a function for adding degrees of interests of both people to perform ranking and another function for performing ranking corresponding to the degree of interest of either one, while indicating the degree of interest of the other one in relation to the ranked merchandise information pieces.

The former function is achieved by performing ranking corresponding to the sum of necessity signals N each of which is calculated based on scores of respective PPF. The latter function is achieved by ranking a merchandise information piece corresponding to the necessity signal N calculated based on scores of PPF of either one, while assigning to the same merchandise information piece a specific mark indicative of the degree of interest corresponding to the necessity signal N calculated based on scores of PPF of the other one.

In addition, these functions of information filtering section 901 are switched corresponding to destination of an ordinary person as a consumer. The ordinary person designates the designation of switching between these functions from the keyboard or the like of consumer terminal 105 through merchandise information client 314.

The operation will be described below of cases where an ordinary person as a consumer places an order for merchandise using PPFs of both the ordinary person and celebrity in EC system 200 according to the second embodiment. A case will be described first where the ordinary person selects the function for adding degrees of interests of both people to perform ranking in information filtering section 910.

In addition, it is herein assumed that PPFs reflective of preferences of the celebrity and ordinary person are already registered respectively with PPF storage section 309 of consumer terminal 103 and PPF storage section 316 of consumer terminal 105.

The ordinary person using consumer terminal 105 designates search criteria of merchandise information interesting the person from the keyboard or the link of consumer terminal 105 through merchandise information client 314, and instructs the search of merchandise information. At the same, the person further instructs information filtering section 901 how to use PPFs of the ordinary person and celebrity from the keyboard or the link of consumer terminal 105 through merchandise information client 314. It is herein assumed to select the function for adding degrees of interests of both people to perform ranking. At this point, a message indicative of using PPF of the celebrity is notified to PPF utilization querying section 317 through merchandise information client 314.

When the information filtering section 315 receives these instructions, the section 315 first accesses to merchandise information server 306, and receives the distribution of the corresponding merchandise information according to the designated search criteria.

Meanwhile, when PPF utilization querying section 317 receives the notification indicative of using PPF of the celebrity, the section 317 queries whether the utilization of PPF is permitted to PPF managing section 310 of merchandise information distribution unit 102. PPF managing section 310 examines the utilitarian information of the ordinary person transmitted along with the query, and judges whether or not to permit the utilization of PPF of the celebrity. It is herein assumed to permit the utilization of PPF of the celebrity.

When the utilization of PPF of the celebrity is permitted, information filtering section 901 performs the filtering processing on the merchandise information pieces distributed from merchandise information server 306, using PPF of the person stored in PPF storage section 316. The merchandise information pieces ranked according to preferences of the person are thus obtained. Information filtering section 901 temporarily stores the thus ranked merchandise information pieces.

At the same time as the above processing, information filtering section 901 transmits the merchandise information pieces distributed from merchandise information server 306 to PPF managing section 310 through PPF utilization querying section 317. PPF managing section 310 provides the merchandise information pieces from consumer terminal 105 to information filtering section 308 of consumer terminal 103.

When information filtering section 308 receives the merchandise information pieces, the section 308 performs the filtering processing on the merchandise information pieces, using PPF stored in PPF storage section 309. The merchandise information pieces searched with the search criteria designated by the ordinary person are thus ranked corresponding to preferences of the celebrity.

When information filtering section 308 completes the ranking (filtering processing) on the merchandise information pieces, the section 308 returns the merchandise information pieces to PPF managing section 310. The merchandise information pieces are returned to PPF utilization querying section 317 of consumer terminal 105.

PPF utilization querying section 317 provides the merchandise information pieces ranked corresponding to preferences of the celebrity to information filtering section 901. When information filtering section 901 receives the merchandise information pieces, the section 901 further ranks the merchandise information pieces using the ranking of the merchandise information pieces corresponding to preferences of the person and the ranking of the merchandise information pieces corresponding to preferences of the celebrity. Namely, the section 901 ranks using preferences of the person and preferences of the celebrity with both considered.

Specifically, the ranking is performed corresponding to a sum of necessity signals N calculated from each merchandise information piece, whereby the overall ranking is determined based on preferences of the person and preferences of the celebrity.

FIG. 10 is a table showing examples of merchandise information pieces subjected to the overall ranking using preferences of the person and preferences of the celebrity. FIG. 10 uses the examples of merchandise information pieces shown in FIG. 7. The necessity signals in FIG. 7 are replaced with necessity signals Na in FIG. 10.

Necessity signals Nb illustrated in FIG. 10 denote necessity signals N calculated based on preferences of the celebrity. It is understood from the necessity signals, the celebrity is interested in merchandise information pieces ①, ④, ③, ②, and ⑤ in this order. Information filtering section 901 determines the ranking of the merchandise information pieces based on the sum of the necessity signal Na of the ordinary person and the necessity signal Nb of the celebrity.

In addition, merchandise information write control section 411 illustrated in FIG. 4 performs such processing for calculating the sum of the necessity signal Na of the ordinary person and the necessity signal Nb of the celebrity to perform the ranking. In this case, merchandise information pieces ① to ⑤ are ranked as shown in FIG. 10, and are stored in merchandise information storage section 412.

In the same way as in the first embodiment, merchandise information output control section 411 generates learning and ordering screen 800 as illustrated in FIG. 8, using the thus ranked merchandise information pieces in merchandise information storage section 412. Assuming that the rank is decreased in the rightward direction and in the downward direction in learning and ordering screen 800 in FIG. 8, merchandise information pieces ①, ④, ③ and ② are indicated respectively in the most upper left, center-left, and center-right, and right columns, while merchandise information piece ⑤ is indicated in the second upper left column on the example shown FIG. 10. Such learning and ordering screen 800 is transferred to merchandise information client 314 through merchandise information output terminal 415. Merchandise information client 314 indicates such learning and ordering screen 800 on the display or the like of consumer terminal 105.

When the ordinary person thus receives the distribution of merchandise information from merchandise information server 306, the person is capable of watching the merchandise information pieces ranked with previous preferences of the ordinary person and of the celebrity reflected, using the display or the like of consumer terminal 105. Then, the ordinary person is capable of placing an order for merchandise based on such merchandise information.

According to the foregoing, it is possible for an ordinary person to place an order for merchandise, while watching the merchandise information ranked with not only preferences of the celebrity buy also preferences of the person. Accordingly, the ordinary person is capable of selecting the merchandise corresponding to preferences of the person as well as preference of the celebrity to place an order therefor. In other words, the ordinary person is capable of selecting the merchandise which corresponds to preferences of the celebrity and which is also provided with the taste of the person.

A case will be described next where an ordinary person selects the function for ranking the merchandise information corresponding to the degree of either person, while indicating the degree of interest of the other person in relation to the ranked merchandise information.

In the same way as in the above case, the ordinary person using consumer terminal 105 designates search criteria of merchandise information interesting the person from the keyboard or the link of consumer terminal 105 through merchandise information client 314, while instructing information filtering section 901 how to use PPFs of the ordinary person and celebrity.

It is herein assumed to select the function for ranking merchandise information corresponding to the degree of either person, while indicating the degree of interest of the other person in relation to the ranked merchandise information. In particular, it is assumed to instruct to rank the merchandise information corresponding to preferences of the person, while indicating the degree of interest of the celebrity in relation to the ranked merchandise information.

In the same way as previously described, information filtering section 901 performs the filtering processing on the merchandise information distributed from merchandise information server 306 according to he search criteria, using PPF of the person stored in PPF storage section 316, while providing the distributed merchandise information to information filtering section 308 through PPF utilization querying section 317 and PPF managing section 310, and receiving the merchandise information subjected to the filtering processing using PPF of the celebrity stored in PPF storage section 309.

When information filtering section 901 thus receives the merchandise information pieces ranked corresponding to preferences of the celebrity, the section 901 indicates a scale of the degree of interest of the celebrity in relation to each merchandise information piece ranked and stored in advance corresponding to preferences of the ordinary person.

Specifically, each merchandise information piece is assigned a specific mark indicative of the degree of interest of the celebrity corresponding to the necessity signal N calculated from the merchandise information piece.

FIG. 11 shows an example of the case of indicating the degree of interest of a celebrity in relation to the merchandise information piece ranked according to preferences of an ordinary person. FIG. 11 uses the example shown in FIG. 7. The necessity signals N in FIG. 7 are replaced with necessity signals Na in FIG. 11.

Necessity signals Nb illustrated in FIG. 11 denote necessity signals N calculated based on preferences of the celebrity. It is understood from the necessity signals, the celebrity is interested in merchandise information pieces ①, ④, ③, ②, and ⑤ in this order. The specific marks corresponding to such a degree of interest are assigned.

In FIG. 11, assigned as specific marks indicative of the degree of interest of the celebrity are a large white circle (○) for the necessity signal of +5, a small white circle (○) for the necessity signal of +1, a large black circle ● for the necessity signal of −5, and a small black circle ● for the necessity signal of −1.

In addition, it is preferable in managing EC system 200 not to indicate negative marks (● in the above case) among the specific marks indicative of the degree of interest of a celebrity.

The present invention is not limited in specific mark to the example shown in FIG. 11. Any marks corresponding to the degree of interest of a celebrity may be used. For example, it may be possible to use as specific marks a mark indicative of a smiling face for a large value of the degree of interest, a mark indicative of a normal face for an average vale thereof, and a mark indicative of a crying face for a small value of thereof.

In addition, merchandise information write control section 411 illustrated in FIG. 4 performs the processing for assigning a specific mark corresponding to the necessity signal Nb of a celebrity to the result based on the necessity signal Na of an ordinary person. In this case, merchandise information pieces ① to ⑤ are ranked as shown in FIG. 11, while being assigned specific marks shown in FIG. 11 to be in stored in merchandise information storage section 412.

As in the first embodiment, merchandise information output control section 414 generates learning and ordering screen 800 as shown in FIG. 8, using the thus ranked merchandise information in merchandise information storage section 412. Assuming that the rank is decreased in the rightward direction and in the downward direction in learning and ordering screen 800 in FIG. 8, merchandise information pieces ④, ①, ②, and ③ are indicated respectively in the most upper left, center-left, and center-right, and right columns, while merchandise information piece ⑤ is indicated in the second upper left column on the example shown FIG. 11. Then, for example, the indication that corresponds to the necessity signal Nb is added to an area of merchandise information 801 of each column. Such learning and ordering screen 800 is transferred to merchandise information client 314 through merchandise information output terminal 415.

Merchandise information client 314 displays such learning and ordering screen 800 on the display or the like of consumer terminal 105.

When an ordinary person thus receives the distribution of merchandise information from merchandise information server 306, the ordinary person is capable of watching the previously ranked merchandise information reflective of preferences of the ordinary person with the degree of interest of the celebrity indicated on each merchandise information. Then, the person is capable of placing an order for merchandise based on such merchandise information.

It is thereby possible for an ordinary person to confirm how the celebrity evaluates each merchandise while watching the merchandise information ranked according to preferences of the person. Accordingly, it is possible for the person to place an order for merchandise matching primarily with preferences of the person and also with preferences of the celebrity.

Thus, according to EC system 200 according to the second embodiment, by using PPFs reflective of both an ordinary person and celebrity, merchandise information pieces are ranked while being reflective of preferences of both people. Placing an order based on the thus ranked merchandise information pieces enables the ordinary person to select the merchandise information matching with preferences of the celebrity as well as matching with preferences of the person.

In addition, while in the above description is indicated the case of ranking merchandise information corresponding to the degree of interest of an ordinary person, while indicating the degree of interest of a celebrity in relation to the ranked merchandise information. However, the present invention is not limited to the above case, and it may be naturally possible to rank merchandise information corresponding the degree of interest of a celebrity, while indicating the degree of interest of an ordinary person in relation to the ranked merchandise information. In this case, it is possible for an ordinary person to place an order for merchandise matching primarily with preferences of the celebrity and also with preferences of the ordinary person.

As described above, according to the present invention, the system has a celebrity register PPF which is registered corresponding to preferences by purchasing merchandise and which is excellent in privacy protection, and enables ordinary people to use such PPF, whereby it is possible for the ordinary people to purchase the merchandise matching with current preferences of the celebrity while protecting the privacy of the celebrity.

The present invention is not limited to the above described embodiments, and various variations and modifications may be possible without departing from the scope of the present invention.

This application is based on the Japanese Patent Application No. 2000-340741 filed on Nov. 8, 2000, entire content of which is expressly incorporated by reference herein.

What is claimed is:

1. An e-commerce system, comprising:
a merchandise information distribution unit comprising a merchandise information storage section that stores merchandise information provided from a seller, and a merchandise information server that distributes the merchandise information from said merchandise information storage section to a consumer;
a plurality of consumer terminals, each comprising a storage section that stores a personal profile in which various keywords contained in the merchandise information and evaluation values corresponding to the keywords are registered, the evaluation values being learned in advance based on a preference of a consumer, and an information filtering section that ranks the merchandise information distributed from said merchandise information server to match the preference of the consumer, based on the personal profile; and
a clearing unit that withdraws a charge of merchandise from an account designated by the consumer to pay to the seller when receiving an order for merchandise from either of said consumer terminals,
a first consumer terminal of said plurality of consumer terminals being configured to transfer distributed merchandise information to an information filtering section of a second consumer terminal of said plurality of consumer terminals, the information filtering section of the second consumer terminal ranking the transferred distributed merchandise information based on a personal profile stored in a storage section of the second consumer terminal, the first consumer terminal being configured to place an order for merchandise using the merchandise information ranked by the second consumer terminal.

2. The e-commerce system according to claim 1, wherein the first consumer terminal including a querying section that queries whether the utilization of the personal profile stored in the storage section of the second consumer terminal is permitted, said merchandise information distribution unit comprising a managing section that stores utilization criteria of the personal profile stored in the storage section of the second consumer terminal, and that determines whether to permit the utilization of the personal profile stored in the storage section of the second consumer terminal when receiving the query from said querying section, and when said managing section permits the utilization of the personal profile stored in said storage section of the second consumer terminal, the merchandise information distributed to the first consumer terminal is transferred to said information filtering section of the second consumer terminal.

3. The e-commerce system according to claim 2, wherein when permitting the utilization of the personal profile stored in said storage section of the second consumer terminal, said managing section notifies the clearing unit of the permission, and said clearing unit withdraws a utilization charge from the account designated by the consumer using the first consumer terminal, and pays the utilization charge to another consumer that uses the second consumer terminal and provides the personal profile stored in the storage section of the second terminal.

4. The e-commerce system according to claim 1, wherein the first consumer terminal is configured to allow a consumer that uses the first consumer terminal to designate a consumer who uses the second consumer terminal to rank the merchandise information.

5. The e-commerce system according to claim 4, wherein the consumer who uses the second consumer terminal is a celebrity.

6. The e-commerce system according to claim 1, wherein the various keywords contained in the merchandise information include identification information of the seller.

* * * * *